Patented May 15, 1945

UNITED STATES PATENT OFFICE 2,375,768

2,375,768

HALOGENATED ETHERS OF HYDROXYDI-HYDRONORDICYCLOPENTADIENE

Herman A. Bruson, Philadelphia, Pa., assignor to The Resinous Products & Chemical Company, Philadelphia, Pa., a corporation of Delaware No Drawing. Application March 24, 1944,
Serial No. 527,955

10 Claims. (Cl. 260—611)

This invention relates to addition-rearrangement products of halogenated alcohols and dicyclopentadiene, said products being dihydronordicyclopentadienyl ethers of said halogenated alcohols.

It is known that ethers are obtained when dihydroalpha-dicyclopentadiene is boiled with alcohols in the presence of selenious acid as an oxidizing agent (Alder and Stein, Liebig's Annalen der Chemie, 504, 207–209 (1933)). These known ethers are derivatives of dihydro-alpha-dicyclopentadieneol-3 and are formed as follows:

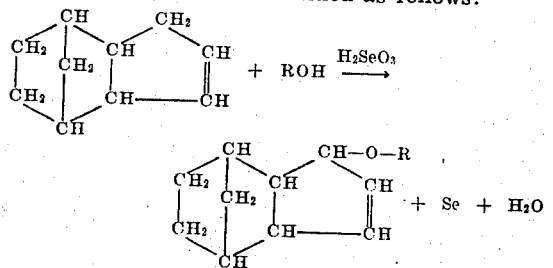

In accordance with the present invention, however, instead of the dihydro-derivative, dicyclopentadiene itself is condensed in the presence of non-oxidizing acidic condensing agents, for example sulfuric acid or boron trifluoride, with a halogenated alcohol whereby addition of the hydroxyl group of the halogenated alcohol across the double bond of the bridged endomethylene cycle of the dicyclopentadiene occurs with a simultaneous molecular rearrangement of the latter to a hitherto unknown polycyclic ring system which for the sake of brevity is herein termed the "nordicyclopentadiene" ring system to distinguish it from the dicyclopentadiene ring system which is its precursor. The product obtained is a dihydronordicyclopentadienyl ether of a halogenated alcohol and is formed in accordance with the following equation (using ethylene chlorohydrin as the simplest halogenated alcohol), Formula A or B representing the constitution of the product, A being the more probable:

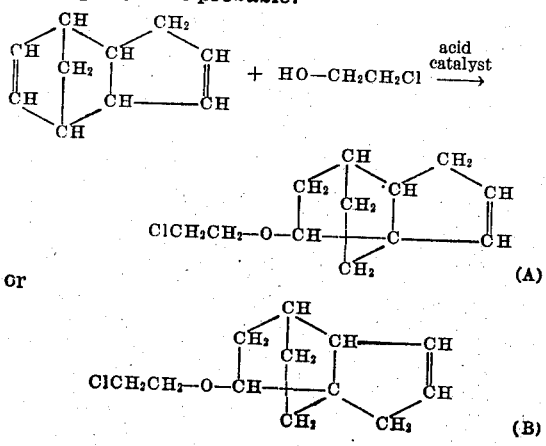

It will be seen that the new ethers obtained according to the present invention differ from the known type in not only containing halogen and being formed by direct addition of the OH group to the double bond without the loss of a hydrogen atom from the dicyclopentadiene nucleus but also in being attached to a different ring of the nuclear system and in having been completely transformed into a new ring system namely the "dihydronordicyclopentadienyl" ring system. It will also be noted that in the dihydronordicyclopentadienyl ethers obtained according to this invention the ether oxygen atom is attached to the ring system through a —CH— group flanked on one side by a —CH$_2$— group and on the other by a tertiary carbon atom, whereas in the known ethers of dihydrodicyclopentadiene-ol-3 the ether oxygen atom is attached to a —CH— group flanked by two secondary —CH— groups. This confers entirely different chemical and physical properties to the respective ethers.

In practicing this invention various halogenated monohydric or polyhydric alcohols of the aliphatic, arylaliphatic, and cycloaliphatic series may be used, for example, the chlorohydrins, bromohydrins or iodohydrins of such olefins as ethylene, propylene, butylene, amylene, octene, dodecylene, octadecylene, styrene, indene, or cyclohexene and, in addition thereto, glyceryl chlorohydrin, glyceryl dichlorohydrin, glyceryl dibromohydrin, and higher homologues thereof. Halogenated ether alcohols may also be used, for example, beta-chloroethoxyethanol, halogenated aryloxyethanols, halogenated aryloxyethoxyethanols, and homologues thereof.

The acidic condensing agents or catalysts which serve to promote the desired addition-rearrangement reaction according to this invention are not only sulfuric acid and boron trifluoride but also acidic derivatives thereof such as organic sulfonic acids, for example, benzene sulfonic acid or methyl sulfonic acid; acid sulfuric esters, for example, ethyl acid sulfate or methyl acid sulfate; coordination complexes of boron trifluoride with oxygenated compounds such as ethers, as BF$_3$.O-(C$_2$H$_5$)$_2$; carboxylic acids, as BF$_3$. 2CH$_3$COOH; alcohols, as BF$_3$.2C$_4$H$_9$OH; ketones, such as BF$_3$.-CH$_3$COCH$_3$; and water, such as BF$_3$.H$_2$O and BF$_3$.2H$_2$O. Furthermore, the halides of amphoteric metals such as zinc chloride, stannic chloride, titanium tetrachloride, antimonic chloride, aluminum chloride, or ferric chloride may be used.

It is surprising that, though boron trifluoride or sulfuric acid resinifies dicyclopentadiene by polymerization in the absence of halogenated alcohols and also polymerizes unsaturated ethers in general, they do neither to any appreciable extent in the case of a mixture of dicyclopentadiene and the halogenated alcohol as described herein. On the contrary they promote the formation of highly reactive unsaturated ether halides of the new type herein described.

In general, only a small amount of catalyst is required, quantities of from 0.5 to 5% on the weight of the reactants being usually sufficient, but larger or smaller quantities are often effective.

The addition-rearrangement reaction may be initiated by mixing the components and catalyst at temperatures even as low as 0° C. in some cases, or at room temperature, or at elevated temperatures. While it is generally desirable to keep the temperature low at the start, the reaction may be carried to completion or accelerated by raising the temperature or by continuing the reaction for a long time at a relatively low temperature. Temperatures as high as 100° C. to 150° C. may thus be used, the upper temperature being limited by the cracking tendency of the dicyclopentadiene to revert to monomeric cyclopentadiene. The reaction range of about 50° C. to 145° C. is generally the most useful, the best working range being 95° C. to 125° C. The reaction can be controlled by the rate of mixing the reactants and by the use of a solvent or diluent, such as a hydrocarbon solvent including petroleum ethers or petroleum naphthas, or chlorinated hydrocarbons such as carbon tetrachloride, ethylene dichloride, tetrachlorethane and the like.

The following examples illustrate this invention, it being understood that the term "dihydronordicyclopentadienyl" refers to the new polycyclic radical $C_{10}H_{13}$—represented by one of the isomeric forms A or B.

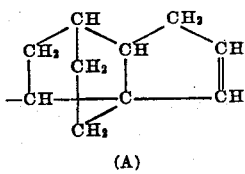

(A)

or

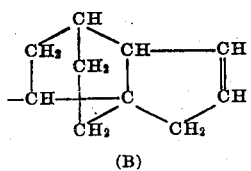

(B)

The most important ether halides obtained according to this invention possess the formula:

wherein $C_{10}H_{13}$— is the dihydronordicyclopentadienyl radical, A is a divalent aliphatic, arylaliphatic, or cycloaliphatic hydrocarbon radical the chain of which may be interrupted by oxygen, and X is halogen.

*Example 1*

(a) To 160 g. of ethylene chlorohydrin, cooled to 5° C. there was gradually added 25 g. of 98% sulfuric acid while the reaction mixture was stirred and maintained at 15°–18° C. After all the sulfuric acid had been added, the mixture was allowed to come to room temperature (28° C.) and was stirred thereat for one and three-quarter hours. To the solution obtained, 132 g. of pure dicyclopentadiene was added and stirring was continued. A gradual exothermal reaction set in during which the temperature rose to 75° C. within a half hour. After this had subsided, the mixture was stirred at 90° to 95° C. for two and one-quarter hours. The product was washed with water, and the residual oil was taken up in toluene and made alkaline by the addition of excess calcium hydroxide. The product was filtered and the filtrate distilled under reduced pressure.

The chloroethoxy-dihydronordicyclopentadiene

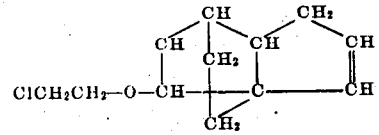

distilled over at 125°–131° C/6 mm. as a pale yellow oil in a yield of 125 g. Upon redistillation it came over as a colorless oil of pleasant odor boiling at 129°–131° C./7 mm. and possessing the following constants:

$n_D^{25}$ 1.5085; $d_4^{25}$ 1.1090

(b) To a stirred mixture of 176 g. of dicyclopentadiene and 161 g. of ethylene chlorohydrin there was gradually added 28 g. of boron fluoride-diethyl ether, $BF_3.O(C_2H_5)_2$, at 60° C. The mixture was stirred at 60° C. for four and one-half hours longer, then washed several times with water, once with dilute sodium carbonate solution and, finally, again with water. The oil was dried and distilled in vacuo, yielding 246 g. of chloroethoxy-dihydronordicyclopentadiene boiling between 132°–136° C./6–7 mm.

(c) Technical 94% dicyclopentadiene was added drop-wise during the course of one and two-third hours to a stirred mixture of 128.8 g. of ethylene chlorohydrin and 10 g. of concentrated 98% sulfuric acid at 90°–96° C. After all had been added, the mixture was stirred two hours longer at 90°–96° C., then washed with water, neutralized with soda, washed again, dried, and distilled in vacuo. The chloroethoxy-dihydronordicyclopentadiene came over at 120°–137° C./5–6 mm. as a pale yellow oil in a yield of 174 g. The amount of technical dicyclopentadiene used was about 125 g.

*Example 2*

To a solution of 281 g. of beta-chloroethoxyethanol and 25 g. of 98% sulfuric acid prepared at 5°–10° C. there was added 132 g. of dicyclopentadiene. The mixture was stirred and heated at 95° C. for three and three-quarter hours, then washed, neutralized, filtered and distilled under reduced pressure.

The beta-chloroethoxyethoxy-dihydronordicyclopentadiene

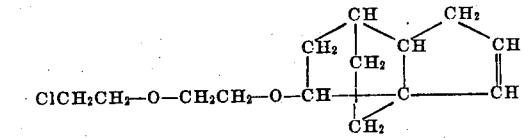

distilled at 145°–155° C./3 mm. as a colorless oil. Upon redistillation it boiled at 142°–146° C./2 mm. and possessed the following constants:

$n_D^{25}$ 1.5021; $d_4^{25}$ 1.1088

It is valuable as an intermediate for the preparation of the corresponding beta-thiocyanoethoxyethoxy-dihydronordicyclopentadiene which is a useful insecticide.

*Example 3*

To a rapidly stirred mixture of 129 g. of 1,3-dichlor-2-propanol and 132 g. of dicyclopentadiene heated to 60° C. there was added dropwise, during the course of 20 minutes, 25 g. of boron trifluoride-diethyl ether, $BF_3.O(C_2H_5)_2$, care being taken to moderate the exothermal reaction by means of a cooling bath so that the reaction temperature did not exceed 65° C. After all the ether had been added and the reaction had ceased, the mixture was stirred for two hours longer at 55°–60° C., then washed with hot water, followed by a wash with soda solution, and then with water. The dark, viscous oil was dried in vacuo on a steam bath. The yield was 205 g. Upon distillation under reduced pressure the alpha, gamma-dichloropropoxy-dihydronordicyclopentadiene

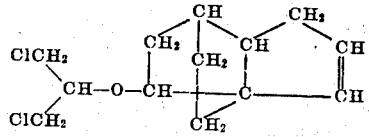

distilled at 150°–160° C./3 mm. as a colorless oil. Upon redistillation it boiled at 140°–142° C./2 mm. and possessed the following constants:

$n_D^{25}$ 1.5187; $d_4^{25}$ 1.191

Example 4

To a stirred solution of 221 g. of glyceryl monochlorohydrin and 3 g. of boron trifluoride-dibutyl ether complex, $BF_3 \cdot O(C_4H_9)_2$, heated to 100° C. there was gradually added dropwise 280 g. of dicyclopentadiene during the course of one hour while the reaction temperature was maintained at 102°–108° C.

After all the dicyclopentadiene had been added, stirring was continued for seven hours at 110°–115° C. The product was then washed with water, with dilute soda solution, finally again with water. It was then dried and distilled in vacuo.

The dihydronordicyclopentadienyloxy-chloropropanol

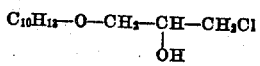

distilled over at 140°–160° C./1 mm. as a colorless oil in a yield of 237 g.

Upon redistillation the pure compound boiled at 155° C./2 mm. and possessed the following constants:

$n_D^{25}$ 1.5181; $d_4^{25}$ 1.149

Example 5

During the course of one and one-quarter hours 350 g. of dicyclopentadiene was gradually added to a stirred mixture of 110 g. of glyceryl monochlorohydrin and 15 g. of boron trifluoride-diethyl ether, $BF_3 \cdot O(C_2H_5)_2$, while the temperature gradually rose from 65° to 105° C. The temperature of the reaction mixture was lowered to 95° C. and held thereat while the mixture was stirred for six and three-quarter hours. The product was cooled, washed with dilute sodium hydroxide solution, dried, and distilled in vacuo. The di-(dihydronordicyclopentadienyl) ether of glyceryl chlorohydrin

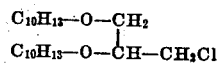

distilled over at 235°–250° C./3–4 mm. as a viscous, reddish oil in a yield of 128 g. Upon redistillation the pure product distilled at 235°–240° C./3.5 mm. as an almost colorless, viscous oil.

Example 6

To a stirred mixture of 66 g. of 2,4-dichlorophenoxyethanol and 52.8 g. of dicyclopentadiene at 45° C. there was added 3 g. of boron trifluoride-diethyl ether, $BF_3 \cdot O(C_2H_5)_2$, and the temperature gradually raised to 95° C. After two and one-half hours at 95° C. the product was washed with warm water, then with dilute sodium hydroxide solution and again with water. The dried oil, upon distillation in vacuo, yielded 60 g. of 2,4-dichlorophenoxyethoxy-dihydronordicyclopentadiene

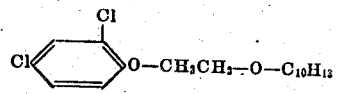

boiling at 220° C./4 mm. as a pale yellow oil.

Example 7

To a stirred solution of 62.1 g. of pentachlorophenoxyethanol and 26.4 g. of dicyclopentadiene at 85° C. there was added 3 g. of boron trifluoride-dibutyl ether complex. The exothermic reaction caused the temperature to rise to 102° C. After this had dropped to 95° C., the mixture was held thereat for two hours by means of a hot water bath. The product was washed with water and with soda solution, dried and distilled in vacuo. The product, in a yield of 53 g., came over at 250°–255° C./3 mm. as a pale yellow, thick oil having the formula

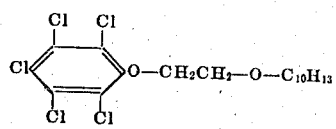

wherein $C_{10}H_{13}$ is the dihydronordicyclopentadienyl group. It crystallized on standing, M. P. 60°–70° C., after recrystallization from petroleum ether. It is useful as a mildew-proofing agent for cotton fabrics.

Example 8

By using 195 g. of 2,6-dichloro-para-alpha,alpha,gamma,gamma-tetramethylbutyl phenoxy-ethanol, 5 g. of boron trifluoride-dibutyl ether complex and 83.5 g. of dicyclopentadiene according to the procedure described in Example 7, there was obtained the corresponding dihydronordicyclopentadienyl ether having the formula

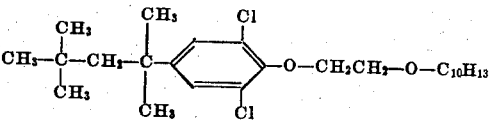

It is a pale yellow, viscous oil boiling at 230°–240° C./1.5–2 mm. The yield was 194 g.

Example 9

A mixture of 125 g. of beta-methyl glyceryl monochlorohydrin, 5 g. of boron trifluoride-dibutyl ether complex, $BF_3 \cdot O(C_4H_9)_2$, and 139 g. of dicyclopentadiene was stirred at 90°–95° C. for seven hours. The mixture was then washed with warm water, dilute soda solution and, finally, with water. It was then dried and distilled in vacuo.

The dihydronordicyclopentadienyloxy tertiary butyl chlorohydrin

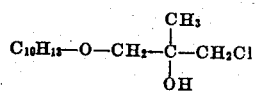

distilled over at 150°–160° C./3 mm. as a colorless oil in a yield of 154 g.

Upon redistillation the pure compound boiled at 150°–153° C./4 mm. and possessed the following constants:

$n_D^{25}$ 1.5075; $d_4^{25}$ 1.1300

Example 10

A stirred mixture of 93 g. of 2-chloro-allyl alcohol and 145 g. of dicyclopentadiene was heated to 55° C. and 10 g. of boron trifluoride-dibutyl ether, $BF_3 \cdot O(C_4H_9)_2$, added. The exothermal reaction carried the temperature to 90° C., at which point cooling was applied. The mixture was then stirred and heated for six hours at 105° C., washed with hot, dilute soda solution, then with water, dried, and distilled in vacuo. The 2-chloroallyloxy-dihydronordicyclopentadiene

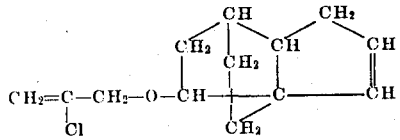

distilled over between 97° and 117° C./1 mm. as a colorless oil in a yield of 151 g.

Upon redistillation the pure compound boiled at 135° C./9 mm.

Example 11

To a stirred mixture of 109 g. of isobutylene chlorohydrin and 139 g. of dicyclopentadiene there was gradually added at 40° C. 10 g. of boron trifluoride-dibutyl ether complex. The mixture was gradually warmed to about 80° C. An exothermal reaction occurred in which the temperature rose to 105° C. The mixture was then heated for four hours at 90°–95° C., after which it was washed with dilute alkali, then with water, dried, and distilled in vacuo.

The dihydronordicyclopentadienyloxyisobutyl chloride

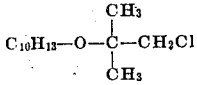

distilled over at 105°–125° C./1–2 mm. as a colorless oil. The yield was 103 g. Upon redistillation the pure compound boiled at 105°–106° C./0.5 mm. and possessed the following constants:

$n_D^{25}$ 1.5014; $d_4^{25}$ 1.0694

Example 12

To a stirred solution of 47.3 g. of trimethylene chlorohydrin and 3 g. of boron trifluoride-dibutyl ether complex, $BF_3 \cdot O(C_4H_9)_2$, at 75°–85° C. there was gradually added, during the course of twenty minutes, 70 g. of dicyclopentadiene. The mixture was stirred and heated at 90° C. for three and one-quarter hours. The dark oil which was obtained was washed with dilute sodium hydroxide solution and then with water, dried, and distilled in vacuo. The gamma-chloropropyl ether of hydroxydihydronordicyclopentadiene distilled over at 110°–120° C./2 mm. as a colorless oil in a yield of 30 g. Upon redistillation the pure compound $ClCH_2CH_2CH_2—O—C_{10}H_{13}$ boiled at 114°–115° C./1.5 mm.

Example 13

By using 50 g. of ethylene bromohydrin, 3 g. of boron trifluoride-dibutyl ether complex, and 56 g. of dicyclopentadiene as in the procedure of Example 12, the bromoethyl ether of hydroxydihydronordicyclopentadiene $BrCH_2CH_2—O—C_{10}H_{13}$ was obtained as a colorless oil boiling at 127° C./3 mm.

The dihydronordicyclopentadienyl ethers of halogenated alcohols obtainable as described herein are useful intermediates for the preparation of insecticides, bactericides, fungicides, plasticizers, and as additives for petroleum lubricants.

This application is a continuation-in-part of copending application Serial No. 476,640, filed February 20, 1943.

I claim:

1. An addition-rearrangement product of dicyclopentadiene and a halogenated alcohol, said product being a dihydronordicyclopentadienyl ether of the halogenated alcohol.

2. An addition-rearrangement product of dicyclopentadiene and a chloro alcohol, said product being a dihydronordicyclopentadienyl ether of the chloro alcohol.

3. An addition-rearrangement product of dicyclopentadiene and ethylene chlorohydrin, said product being a dihydronordicyclopentadienyl ether of the chlorohydrin.

4. An addition-rearrangement product of dicyclopentadiene and glycerol monochlorohydrin, said product being a dihydronordicyclopentadienyl ether of the glycerol chlorohydrin.

5. An addition-rearrangement product of dicyclopentadiene and beta-chloroethoxyethanol, said product being a dihydronordicyclopentadienyl ether of the beta-chloroethoxyethanol.

6. A method for preparing an addition-rearrangement product of dicyclopentadiene and a halogenated alcohol, said product being a dihydronordicyclopentadienyl ether of the halogenated alcohol, which comprises reacting dicyclopentadiene with a halogenated alcohol in the presence of an acidic condensing agent.

7. A method for preparing an addition-rearrangement product of dicyclopentadiene and a halogenated alcohol, said product being a dihydronordicyclopentadienyl ether of the halogenated alcohol, which comprises reacting dicyclopentadiene with a halogenated alcohol in the presence of a boron trifluoride catalyst.

8. A method for preparing an addition-rearrangement product of dicyclopentadiene and ethylene chlorohydrin, said product being a dihydronordicyclopentadienyl ether of said ethylene chlorohydrin, which comprises reacting dicyclopentadiene with ethylene chlorohydrin in the presence of a boron trifluoride catalyst.

9. A method for preparing an addition-rearrangement product of dicyclopentadiene and glyceryl monochlorohydrin, said product being a dihydronordicyclopentadienyl ether of said glyceryl monochlorohydrin, which comprises reacting dicyclopentadiene with glyceryl monochlorohydrin in the presence of a boron trifluoride catalyst.

10. A method for preparing an addition-rearrangement product of dicyclopentadiene and beta-chloroethoxyethanol, said product being a dihydronordicyclopentadienyl ether of said beta-chloroethoxyethanol, which comprises reacting dicyclopentadiene with beta-chloroethoxyethanol in the presence of a boron trifluoride catalyst.

HERMAN A. BRUSON.